A. J. SEGER & A. & J. LOWE.
CUTTING MECHANISM.
APPLICATION FILED NOV. 22, 1910.
992,691.
Patented May 16, 1911.
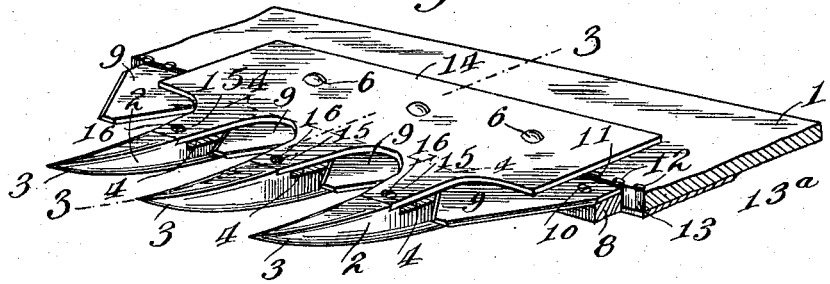
Fig. 1.
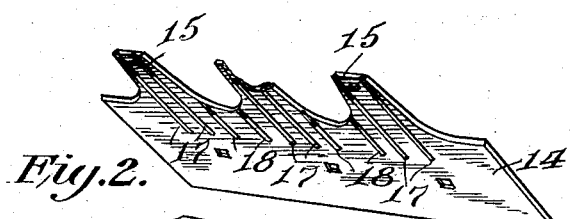
Fig. 2.
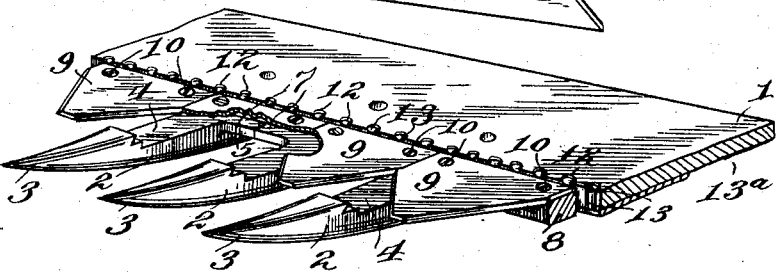
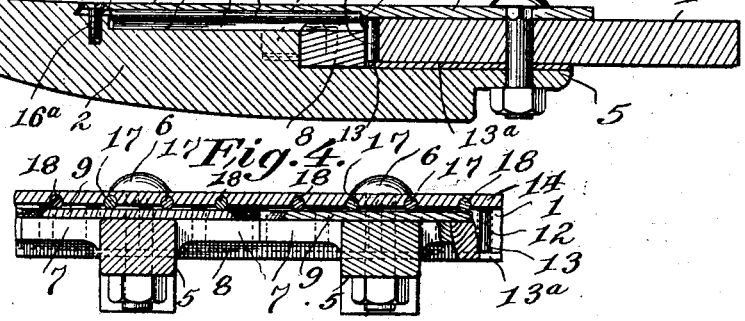
Fig. 3.
Fig. 4.
Witnesses
Horace N. Lybrand
C. C. Hines
Inventors
Asael Lowe
John Lowe and
Albert J. Seger
By Victor J. Evans
Attorney
THE NORRIS PETERS CO., WASHINGTON, D. C.

UNITED STATES PATENT OFFICE.

ALBERT J. SEGER, ASAEL LOWE, AND JOHN LOWE, OF WARD, IDAHO.

CUTTING MECHANISM.

992,691.     Specification of Letters Patent.     Patented May 16, 1911.

Application filed November 22, 1910. Serial No. 593,710.

*To all whom it may concern:*

Be it known that we, ALBERT J. SEGER, ASAEL LOWE, and JOHN LOWE, citizens of the United States, residing at Ward, in the county of Cassia and State of Idaho, have invented new and useful Improvements in Cutting Mechanism, of which the following is a specification.

This invention relates to cutting mechanism of the reciprocating type employed most especially for agricultural implements such as mowers, harvesters and the like.

The primary object of the invention is to provide anti-friction bearings for the reciprocating cutter and bar or sickle, whereby ease of operation of the cutter bar is insured, and also to provide a novel construction of guard, whereby the cutter bar is held for movement in a straight path and maintained in contact with the ledger faces to prevent the entrance of the grass or other material being cut between the knives and ledger faces and consequent liability of injury to the cutter bar.

A further object of the invention is to provide a novel construction and arrangement of anti-friction bearings and guard, whereby a self-sharpening action of the knives of the cutter bar is secured.

The invention consists of the features of construction, combination and arrangement of parts, hereinafter fully described and claimed, reference being had to the accompanying drawings, in which:—

Figure 1 is a perspective view of a portion of a mower or harvester cutting mechanism embodying our invention. Fig. 2 is a similar view with the guard plate detached and thrown back to expose the under side thereof. Fig. 3 is a section on the line 3—3 of Fig. 1. Fig. 4 is a section on the line 4—4 of Fig. 1.

Referring to the drawings, 1 designates the finger bar of the cutting apparatus, which may be of the ordinary general type or any other suitable type according to the make or special design of the cutting appliance applied thereto. This bar carries the usual guard fingers 2 tapering to points 3 and provided with the ledger faces 4 and having shanks 5 extending beneath the finger bar and suitably secured thereto, as by bolts 6. Projections 7 extend from opposite sides of the guard fingers and contact with each other, so as to brace the series of fingers against transverse strains in the reciprocation of the cutter bar.

The cutter bar 8 carries the usual longitudinal series of cutting knives 9 which, in the reciprocation of said bar, rest upon and are supported by the ledger faces 4 and between the respective ledger faces by the projections 7, the upper surfaces of which projections lie in the plane of said ledger faces. The knives are secured to the cutter bar by bolts or other suitable fastenings 10 and their rear or heel edges 11 are arranged to lie flush with the rear longitudinal edge of the bar to increase the effective depth of the rear bearing surface of the latter. The front edge of the finger bar 1 is provided with a longitudinal series of vertical recesses 12 arranged a desired distance apart, in which recesses are revolubly mounted anti-friction bearing rolls 13 which project slightly beyond the edge of the bar and contact with the rear or heel edges of the cutter bar and knives, by which the friction between such surfaces is reduced and the cutter bar mounted to reciprocate in a true plane parallel with the bearing edge of the bar. Downward displacement of said rollers is prevented by a retaining plate $13^a$ secured to the under side of the finger bar.

A guard composed of one or more sections, according to the length of the cutting mechanism, is provided to overlie the cutter bar and hold the same from upward displacement. Each guard, or each section thereof, when more than one guard member is employed, consists of a substantially oblong rectangular plate 14, the rear half of which overlaps the finger bar and is secured thereto by the bolts 6, and the front half of which overlies the cutter bar and the body portions of the knives 9. The front edge of said guard plate is provided with a series of reduced extensions 15 forming supplemental guard fingers equal in number to the fingers 2 and arranged to extend over the ledger faces 4 in spaced relation thereto, to form the usual passages or guideways for the cutting knives 9. The front edge of each finger 15 is beveled or otherwise suitably formed to fit within an undercut notch or recess $15^a$ in the coöperating finger 2 and is perforated for the passage of an adjusting and securing screw 16 which enters a threaded aperture $16^a$ in the underlying finger 2, through the action of which screw the finger 15, which possesses the requisite degree of flexibility, may be adjusted or drawn downwardly to the desired extent to press the cutting knives with a greater or less degree of force against the ledger faces.

Journaled upon the under side of the guard plate 14 are pairs of long anti-friction rollers 17 and intervening pairs of short friction rollers 18. The friction rollers 17 are arranged in alinement with the fingers 15 and extend from points in line with the longitudinal center of the guard plate to the outer ends of the fingers, while the pairs of rollers 15 are disposed in the spaces between the inner or rear ends of the sets of rollers 17. These sets of rollers are arranged to bear against the upper faces of the knives 9 and to reduce the friction between the same and the guard plate, and at the same time maintain the knives in contact with the ledger faces. By the adjustment of the screws 16 the guard plate may be caused to bear with sufficient force to cause the rollers to press the cutting knives to a sufficient degree down against the ledger faces so as to institute sufficient friction to cause just enough wear upon the edges of the knives in the reciprocation of the cutter bar to make the cutting surfaces self-sharpening in action.

It will be seen from the foregoing description that the invention provides a cutting apparatus of the character specified in which the arrangement of the anti-friction rollers and guard is such as to cause the sickle or cutter bar to move at all times in a straight line and to secure only sufficient friction between the ledger faces and the cutting edges of the knives to maintain said edges at all times in a sharpened and truly effective cutting condition. It will also be seen that by thus causing the knives to move in contact with the ledger faces and maintaining close contact between the knives and guard, the entrance of grass or other substances between said parts will be prevented and chocking of the cutting mechanism in operating upon tangled grass or other vegetation obviated.

Having thus described our invention, we claim:—

1. A cutting apparatus of the character described comprising a finger bar, a reciprocating cutter, a guard plate extending longitudinally above the cutter and having forwardly projecting fingers extending longitudinally over the fingers of the bar, and antifriction bearing rollers arranged upon the underside of said fingers of the plate and extending substantially the full length of said fingers so as to extend fully over the cutting knives and hold the same in contact with the fingers of the bar.

2. In a cutting mechanism of the character described, the combination of a finger bar provided with guard fingers having ledger faces, anti-friction rollers upon the front edge of said finger bar, a cutter bar carrying a series of knives arranged to rest upon the ledger faces, said knives having their rear edges flush with the rear edge of the bar and running with the same in contact with said friction rollers, a guard plate secured to the finger bar and overlapping the cutting knives, said guard plate being provided with supplemental fingers extending over the ledger faces, means adjustably securing said supplemental fingers to the guard fingers, pairs of long rollers journaled on the under side of the guard plate in line with the supplemental fingers and arranged to bear against the upper surfaces of the cutting knives, and pairs of shorter anti-friction rollers journaled on the under side of the guard plate between the pairs of longer rollers and contacting with the cutting knives, said sets of rollers being adapted by the adjustable connection between the sets of fingers to hold the cutting knives with a determined degree of pressure against the ledger faces.

3. A cutting apparatus of the character described comprising a finger bar having guard fingers provided with ledger faces, a reciprocating cutter bar having knives arranged to travel across said faces, a guard plate provided with fingers extending above the cutting knives and over the fingers of the cutter bar to a point beyond the free extremities of the knives, means adjustably connecting said fingers of the guard plate with the fingers of the finger bar, and rollers arranged upon said finger bar to extend wholly across the knives and maintain the same in contact with said ledger faces.

4. A cutting apparatus comprising a finger bar having vertical recesses in its front edge of nearly cylindrical form and opening through the top thereof, a retaining plate closing the lower ends of said recesses, guard fingers secured to and extending from said bar, a guard plate secured to the bar and closing the upper ends of the recesses and having portions extending over and adjustably secured to the guard fingers, anti-friction bearing rollers seated in said recesses and resting on said retaining plate, a cutter bar having its rear edge moving in contact with the exposed surfaces of said rollers, and rollers upon the guard plate arranged to bear upon the knives of the cutter bar.

5. A cutting apparatus of the character described comprising a finger bar provided in its front edge with vertical recesses, guard fingers having shanks secured to the bar and provided with ledger faces, antifriction rollers mounted in said vertical recesses in the front edge of the finger bar, a retaining plate arranged upon the underside of the finger bar to support the rollers within said recesses, a reciprocating cutter bar provided with knives having their rear edges lying coincident with the rear edge of the bar and movable therewith in contact with the rollers, a guard plate secured to the finger bar and extending over the cutter bar and provided with supplemental fingers secured to the fingers of the finger bar, and antifriction rollers mounted upon the underside of the guard plate and bearing upon the cutting knives to maintain the same in contact with the ledger faces.

6. A cutting apparatus of the character described comprising a finger bar provided with guard fingers and ledger faces, a reciprocating cutter bar carrying knives movable across the ledger faces, a guard plate secured to the finger bar and overlapping the cutter bar and provided with supplemental fingers overhanging said ledger faces, means adjustably securing said supplemental fingers to the guard fingers, and a series of antifriction rollers arranged at intervals along the guard plate and bearing against the knives to hold the same in engagement with the ledger faces, said series comprising relatively long and short rollers extending in line with and along the supplemental fingers and between the supplemental fingers, respectively.

In testimony whereof we affix our signatures in presence of two witnesses.

ALBERT J. SEGER.
ASAEL LOWE.
JOHN LOWE.

Witnesses:
GEORGE A. SMITH,
NORMAN ISACHSON.

---

Copies of this patent may be obtained for five cents each, by addressing the "Commissioner of Patents, Washington, D. C."